(12) United States Patent
Chen et al.

(10) Patent No.: US 9,947,067 B2
(45) Date of Patent: Apr. 17, 2018

(54) RADIATION IMAGE INSPECTION SYSTEM AND METHOD BASED ON B/S ARCHITECTURE

(71) Applicants: TSINGHUA UNIVERSITY, Beijing (CN); Nuctech Company Limited, Beijing (CN)

(72) Inventors: Zhiqiang Chen, Beijing (CN); Li Zhang, Beijing (CN); Ziran Zhao, Beijing (CN); Xianghao Wu, Beijing (CN); Limin Liu, Beijing (CN); Min Li, Beijing (CN); Xiaoming Song, Beijing (CN); Xinfang Huang, Beijing (CN); Ying Li, Beijing (CN)

(73) Assignees: TSINGHUA UNIVERSITY, Beijing (CN); NECTECH COMPANY LIMITED, Beijing (CN)

( * ) Notice: Subject to any disclaimer, the term of this patent is extended or adjusted under 35 U.S.C. 154(b) by 93 days.

(21) Appl. No.: 14/753,520

(22) Filed: Jun. 29, 2015

(65) Prior Publication Data
US 2015/0379677 A1 Dec. 31, 2015

(30) Foreign Application Priority Data
Jun. 27, 2014 (CN) .......................... 2014 1 0295564

(51) Int. Cl.
G06F 17/30 (2006.01)
G06T 1/60 (2006.01)
G06T 1/20 (2006.01)

(52) U.S. Cl.
CPC .......... *G06T 1/20* (2013.01); *G06F 17/30861* (2013.01); *G06F 17/30902* (2013.01); *G06T 1/60* (2013.01)

(58) Field of Classification Search
None
See application file for complete search history.

(56) References Cited

U.S. PATENT DOCUMENTS

| 7,945,105 B1 | 5/2011 | Jaenisch |
| 2009/0208076 A1 | 8/2009 | Nakajima et al. |
| 2014/0108656 A1* | 4/2014 | Salinca ................... G06F 9/505 709/226 |

OTHER PUBLICATIONS

Mathis ("Increasing Page Speed with Proper Image Formatting", Jun. 5, 2014, http://www.interactivesearchmarketing.com/jpeg-png-proper-image-formatting/).*

(Continued)

*Primary Examiner* — Xin Sheng
(74) *Attorney, Agent, or Firm* — Scully Scott Murphy & Presser (57) ABSTRACT

The present disclosure provides a radiation image inspection system based on B/S architecture. The system comprises: at least one client terminal, configured to initiate an image operation request to a Web server, and display an image operation result on a browser of the client terminal upon receiving a response from the Web server; an image processing assembly, configured to query, based on the image operation request from the client terminal and forwarded by the Web server, an image which the client terminal desires to process, perform an operation on an image as requested by the client terminal, convert the resulted image into an image in a designated format and quality and return the converted image to the browser of the client terminal via the Web server for displaying; and the Web server, configured to receive the image operation request from the client terminal, forward the image operation request to the image processing assembly, and return the image operation result from the image processing assembly to the client terminal.

12 Claims, 5 Drawing Sheets

(56) References Cited

OTHER PUBLICATIONS

Collins, "Implementing an image cache for PHP GD", 2004, http://www.alphadevx.com/a/57-Implementing-an-Image-Cache-for-PHP-GD.*
Birla, "How to build a scalable, caching, resizing image server", 2011, http://sumitbirla.com/2011/11/how-to-build-a-scalable-caching-resizing-image-server/.*
Hsu W. et al., "SPIRS: A Web-Based Image Retrieval System for Large Biomedical Databases", International Journal of Medical Informatics 78S:S13-S24 (2009).
"B/S and C/S Software Architecture Comparison", Database Skill (5 pages) (Jun. 16, 2011).
"Apache HTTP Server Version 2.4-Authentication and Authorization", (6 pages) (Dec. 11, 2012).
"Web cache-Wikipedia, the free Encyclopedia", (3 pages) (May 31, 2014).
"IIS 7.0 Performance: Adding Processing Power vs. Load Balancing", (32 pages) (Feb. 2009).
Extended European Search Report dated Nov. 3, 2015 received in European Patent Application No. 15 17 4244.2.

\* cited by examiner

RADIATION IMAGE INSPECTION SYSTEM AND METHOD BASED ON B/S ARCHITECTURE

CROSS-REFERENCE TO RELATED APPLICATIONS

The present application is based upon and claims priority to Chinese Patent Application No. 201410295564.2, filed Jun. 27, 2014, the entire contents of which are incorporated herein by reference.

TECHNICAL FIELD

The present disclosure relates to image inspection with radiation imaging, and more particularly, relates to a radiation image inspection system and method based on B/S architecture.

BACKGROUND

Conventional software of a radiation image inspection system for a container performs the following functions in local: (1) performing various image processing for a target image, including zooming-in and zooming-out, color transformation, edge enhancement, gray-scale transformation or the like; (2) attaching a suspect mark to a target area; and (3) presenting an identification conclusion for the target image.

In the related art, the radiation image inspection system for a container is generally common image processing software, typically in a form of a software installation package. The image processing software is required to be installed on each terminal configured to perform the radiation image inspection. A user of the terminal performs inspection and identification for the images through relevant functions provided by the image processing software installed on the terminals.

Such image inspection software imposes higher requirements on the configuration of the terminal. Servers configured with high-end graphics cards are desired, such that the image inspection process is restricted to the server in an inspection workstation, thereby limiting usage of the software.

In the related field, it is generally desirable that radiation image processing software which requires various complicated manipulation may run on local servers. In this regard, the conventional software is too complicated in installation, maintenance and function expanding, while an effective solution to this is still yet to be proposed.

SUMMARY

Improvement to the conventional radiation image inspection system is desired. Accordingly, the present disclosure provides a radiation image inspection system based on B/S architecture, aiming to solve the long troubled problem in the related art.

The radiation image inspection system based on B/S architecture is required to solve an essential problem regarding processing performance. In the related art, the software exclusively runs on the local server, and the user may operate the software to fully utilize the resources on the local server. While the B/S architecture is based on a request/response mode, in which the server responses to a plurality of terminal users, and requests/responses and data transmission are performed for many times between a central server and a client terminal server to complete an image inspection. Accordingly, it poses a challenge as how to achieve in such B/S architecture an image processing performance approximate to that of the conventional exclusive software.

The present disclosure provides a radiation image inspection system based on B/S architecture. In the system, most of the image processing functions are implemented in the server, and images may be processed in the client terminal merely through a common Web browser. The present disclosure solves the problem that in the related art, the radiation image inspection system has to be installed on the client terminal, and also solves the technical problem existing in the radiation image inspection system based on B/S architecture in a particular environment.

In a first aspect, the present disclosure provides a radiation image inspection system, including:

at least one client terminal, configured to initiate an image operation request to a Web server, and display an image operation result on a browser of the client terminal upon receiving a response from the Web server;

an image processing assembly, configured to query, based on the image operation request from the client terminal and forwarded by the Web server, an image which the client terminal desires to process, perform an operation on the image as requested by the client terminal, convert the resulted image into an image in a designated format and quality and return the converted image to the browser of the client terminal via the Web server for displaying; and the Web server, configured to receive the image operation request from the client terminal, forward the image operation request to the image processing assembly, and return the image operation result from the image processing assembly to the client terminal.

Alternatively, the image processing assembly includes:

an image logic processing module, configured to receive the image operation request from the client terminal via the Web server, and schedule and control image processing;

a storage module, configured to store various images and data;

an image reading module, configured to receive an image loading request from the image logic processing module, send an image searching request to the storage module, and load and parse an image;

at least one image processing module, configured to process the image; and an image process scheduling module, configured to request the image processing module to process the image according to an image processing request from the image logic processing module.

Alternatively, the image processing assembly further includes:

an image caching module, configured to cache the image; and an image converting module, configured to convert the image according to an image converting request from the image logic processing module, and return the converted image to the image logic processing module;

wherein, the image logic processing module, in response to the image operation request, sends an image querying request to the image caching module, and returns the image to the image logic processing module when the image which the client terminal desires to process exists in the image caching module; and the image reading module loads and parses the image from the storage module when the image which the client terminal desires to process does not exist in the image caching module; and the image process scheduling module includes: an image process scheduling and controlling submodule; and a image process scheduling feedback submodule corresponding to each image processing module;

wherein the image process scheduling and controlling submodule receives the image processing request from the image logic processing module, and sends a request for querying resource usage details to the image process scheduling feedback submodule; the image process scheduling feedback submodule acquires resource usage details of a corresponding current machine, and feeds back the resource usage details to the image process scheduling and controlling submodule; and the image process scheduling and controlling submodule selects a machine with a lowest resource usage rate according to the resource usage details of the machines which the image processing modules corresponds to, and sends an image processing request to the image processing module on the selected machine.

Alternatively, the Web server performs an authentication to the image operation request it received, denies the image operation request which does not pass the authentication, and forwards the image operation request which passes the authentication to the image processing assembly.

In a second aspect, the present disclosure provides a radiation image inspection system, including:

at least one radiation imaging device terminal;

a radiation image database, configured to store radiation images obtained by the at least one radiation imaging device terminal;

a centralized image storage machine, including a storage module configured to store images and data from the radiation image database;

at least one inspection terminal;

a Web server, including a Web service module;

an application server, including an image logic processing module, an image reading module, and an image process scheduling and controlling module; and at least one image processing server, each including an image process scheduling feedback module and an image processing module;

wherein the image logic processing module receives an image operation request from each image inspection terminal via the Web server, and schedules and controls image processing;

the image reading module receives an image loading request from the image logic processing module, sends an image searching request to the storage module, and loads and parses an image; and the image process scheduling and controlling module receives an image processing request from the image logic processing module, and sends a request for querying, in a polling manner, resource usage details to the image process scheduling feedback module corresponding to each image processing server; each image process scheduling feedback module acquires resource usage details of a corresponding current image processing server, and feeds back the resource usage details to the image process scheduling and controlling module; and the image process scheduling and controlling module selects an image processing server with a lowest resource usage rate according to the resource usage details of the image processing servers respectively corresponding to the image processing modules, and sends the image processing request to the selected machine.

Alternatively, the application server further includes an image caching module and an image converting module;

the image converting module converts the image according to an image converting request from the image logic processing module, and returns the converted image to the image logic processing module; and the image logic processing module, in response to the image operation request, sends an image querying request to the image caching module, and returns the image to the image logic processing module when the image which the client terminal desires to process exists in the image caching module; and the image reading module loads and parses the image from the storage module when the image which the client terminal desires to process does not exist in the image caching module.

Alternatively, the Web server further includes an authentication module, configured to perform an authentication to the image operation request it received, deny the image operation request which does not pass the authentication, and forward the image operation request which passes the authentication to the image processing module.

In a third aspect, the present disclosure provides a radiation image inspection method, including the following steps:

step 1, after a client terminal sends a request for processing an image to a Web server via a Web browser, an image logic processing module receives the request for processing the image forwarded by the Web server;

step 2, the image logic processing module judges situations according to the request for processing the image, in a situation where the image has been cached, reads the image directly form an image caching module; and in a situation where the image has not been cached, the image logic processing module sends an image reading request to an image reading module, and the image reading module returns an original image of the image; and step 3, after it receives the returned image, the image logic processing module correspondingly processes the image, stores the processed image to the image caching module, returns the resulted image to the Web server, and the resulted image is returned to the client terminal via the Web server, for displaying on the Web browser.

Alternatively, in the step 1, after it receives the request for processing the image, the Web server perform an authentication to the client terminal which sends the request, and only when the client terminal is authenticated as a legal client terminal and having permission to processing the image, forwards the request for processing the image to the image logic processing module.

Alternatively, in the step 3, after it processes the corresponding image, the image logic processing module converts the resulted image into an image in a designated format and precision, and returns the converted image to the Web server.

In a fourth aspect, the present disclosure provides a non-transitory computer-readable storage medium storing instructions that, when executed by a processor of a server, cause the server to perform:

step 1, after a client terminal sends a request for processing an image to a Web server via a Web browser, an image logic processing module receives the request for processing the image forwarded by the Web server;

step 2, the image logic processing module judges situations according to the request for processing the image, in a situation where the image has been cached, reads the image directly form an image caching module; and in a situation where the image has not been cached, the image logic processing module sends an image reading request to an image reading module, and the image reading module returns an original image of the image; and step 3, after it receives the returned image, the image logic processing module correspondingly processes the image, stores the processed image to the image caching module, returns the resulted image to the Web server, and the resulted image is returned to the client terminal via the Web server, for displaying on the Web browser.

Alternatively, in the step 1, after it receives the request for processing the image, the Web server perform an authentication to the client terminal which sends the request, and only when the client terminal is authenticated as a legal client terminal and having permission to processing the image, forwards the request for processing the image to the image logic processing module.

Alternatively, in the step 3, after it processes the corresponding image, the image logic processing module converts the resulted image into an image in a designated format and precision, and returns the converted image to the Web server.

In the system according to the present disclosure, by image caching, distributed image processing, and image conversion, it may be achieved an image processing performance approximate to that of the conventional exclusive software in a desirable network condition. Although it is supposed herein that the processing capability of the machine in the related art is similar to that of the image processing machine of the present system, while in practice, it is generally be low the central processing machine applied in the present system.

DETAILED DESCRIPTION

Figure 1:
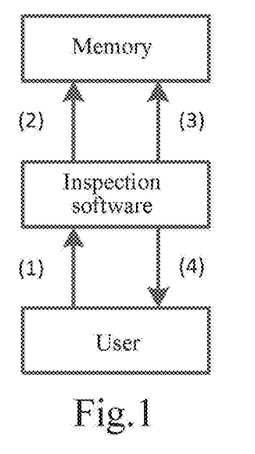
FIG. 1 is a block diagram of a radiation image inspection system according to the related art.

In the related art, a conventional radiation image inspection system based on a software installation package is as illustrated in FIG. 1. The specific operation procedure is as follows:

(1) A user starts the software in local, and sends a request for processing an image.

(2) The local software makes a judgment according to the content of the request. If the image is operated for a first time, the image is read and stored in a memory. If the image is not operated for the first time, the corresponding image is searched out in the memory.

(3) through client terminal software, the image is processed according to the request from the user, and the processing result is stored in the memory.

(4) through the client terminal software, the processing result of the image is presented.

Accordingly, in the conventional solution, both the image processing and presenting is completed in local. Thus, any user who desires to use the system needs to install the image inspection software firstly. In practice, it is both time-consuming and labor-consuming for a user, for example, the Customs, to install and updated software each time an image inspection worksite is to be established or updated.

The technical solutions according to the present disclosure are further described with reference to accompanying drawings.

A core idea of the system and method according to the present disclosure is to configure the image processing function on the server, and in this way, addition, deletion and maintenance of the functions may be achieved only by modifying the program on the server. As such, upgrade of the system may be implemented, and thus extension of the maintenance is very convenient. In addition, since the present disclosure employs the B/S architecture, radiation image inspection may be implemented through a common browser on a common client terminal, with no need of additionally installing other programs, which is very convenient. In addition, by caching an image to be operated again later, a similar processing manner to that of the exclusive software may be realized, thereby improving the image processing performance. In addition, through an image format converting module, data transmission traffic between a server and a client terminal may be reduced, and the user experience may be improved. Further, the image processing is supported by distributed processors, allowing the entire system to be dynamically expanded with machines for processing images according to a number of the user, and improving the dynamic expandability of the processing system. Moreover, the image processing system has an open interface, and may be simply integrated with a third-party system, allowing the inspection system is applied in a more flexible manner.

Figure 2:
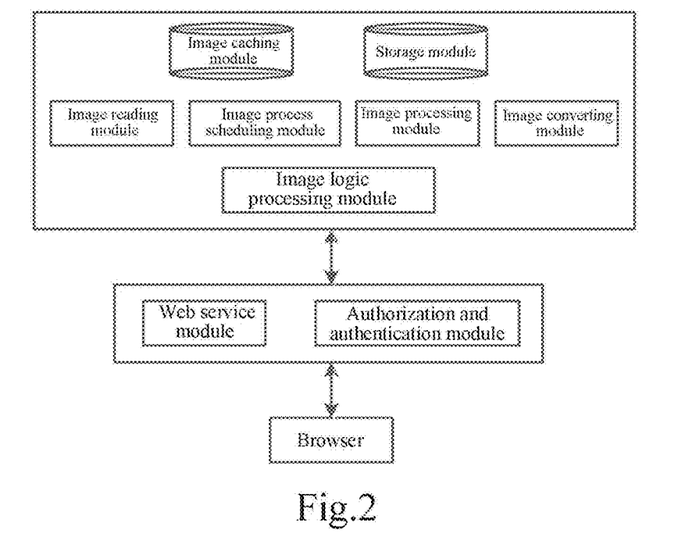
FIG. 2 is a block diagram of a radiation image inspection system based on a B/S mode according to the present disclosure.

FIG. 2 is a block diagram of a radiation image inspection system based on a B/S mode according to the present disclosure. As illustrated in FIG. 2, the radiation image inspection system based on the B/S mode generally includes three parts: an image processing assembly, a Web server, and at least one client terminal.

The image processing assembly includes an image logic processing module, an image reading module, an image process scheduling module, at least one image processing module, an image converting module, an image caching module and a storage module. The image logic processing module generally implements scheduling and controlling of the image processing. Herein, the scheduling of the image reading module, the image process scheduling module, the image converting module, the image caching module, and the storage module are controlled by the image logic processing module. Therefore, the image logic processing module is a central controller of the image processing.

In addition, the image reading module generally implements the functions of loading and parsing images, and various image formats may be defined in this module to support parsing of a specific image format.

Further, the image process scheduling module is a scheduling and controlling module for image processing. The image process scheduling module includes an image process scheduling and controlling submodule and an image process scheduling feedback submodule. The image process scheduling and controlling submodule generally receives an image processing request from the image logic processing module, sends a request for querying resource usage details to the image process scheduling feedback submodule. The image process scheduling feedback submodule acquires current resource usage details of a machine where it runs, and feeds back the resource usage details of the machine to the image process scheduling and controlling submodule. The image process scheduling and controlling submodule selects a machine with a lowest resource usage rate according to the resource usage details of the machines respectively corresponding to the image processing assemblies, and sends an image processing request to the selected machine. In general, the image process scheduling and controlling submodule is disposed together with the image logic processing module. If it is desired, they may also be disposed separately. In addition, the image process scheduling feedback submodule is disposed together with the image processing module. Each image processing machine is provided with an image process scheduling feedback submodule and an image processing module. Thereby, an image processing machine may be dynamically added whenever it is desired, and each additional image processing machine is required to be registered with the image process scheduling and controlling submodule.

In addition, the image processing module generally implements the function of processing images, and the image processing function may be flexibly defined in this module to support addition of a specific image processing function. The image processing module is a core module in the system according to the present disclosure.

Moreover, the image converting module, serving as an interface between an image and a client terminal browser, may define the output image format (for example, common formats such as jpg, bmp or the like) as desired. Herein, a source image is converted into an output image with a certain precision.

In addition, the storage module is configured to store an original format and a converted format of an image, a suspected remark and conclusion of a user, and ensure data security. The storage module may he maintained by a dedicated enterprise-level database management system, for example, an ORACLE system, SQLServer or the like, or may be maintained by a matured source-opened database management system, for example, a MYSQL system, a POSTGRESQL system or the like, or may be maintained by a file system. The storage module according to the present disclosure may run on a separate server as an independent module, or may be disposed and run on the same server together with the image logic processing module, the image reading module, the image process scheduling module, the image caching module, and the image converting module, to save cost for the system.

In addition, the Web server is configured to receive and process a user request, authenticate a user, and implement a function of interacting with the image processing assembly.

Further, the client terminal is a common client terminal, and may access the Web server through a Web browser provided by the local operating system or another browser installed by the user, and present the image on a common Webpage after obtaining the image processed by the image converting module.

Figure 3:
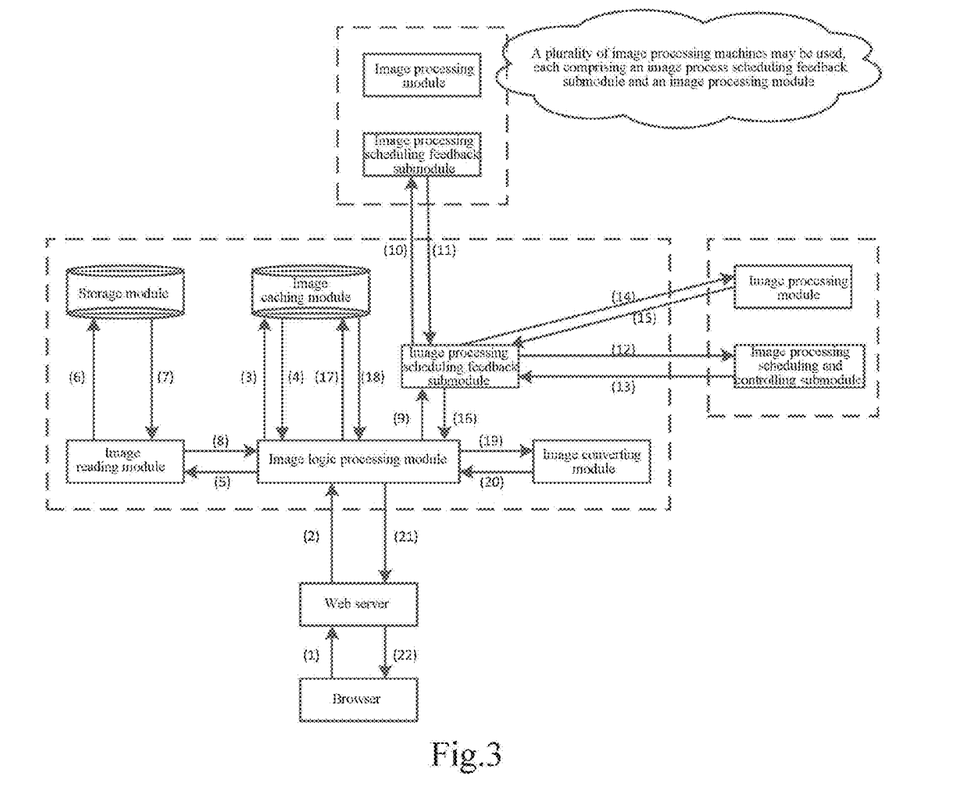
FIG. 3 is a flowchart of a radiation image inspection process based on a B/S mode according to the present disclosure.

In addition, FIG. 3 is a flowchart of a radiation image inspection process based on a B/S mode according to the present disclosure. The image processing procedure on a common client terminal is described hereinafter.

1. A client terminal sends a request for processing an image to a Web server via a common Web browser.
2. Upon receiving the request for processing an image, the Web server authenticates a user, and when determining that the user is an authorized user and has a permission to access the image processing, forwards the request for processing an image to an image logic processing module.
3. The image logic processing module sends an image querying request to an image caching module.
4. The image caching module judges whether the image exists. If the image exists, the image caching module directly returns the cached image, and otherwise, it notifies the image logic processing module that the image does not exist.
5. The image logic processing module makes a judgment according to the result returned by the image caching module. If the image is cached, the process proceeds to step 9; and if the image is not cached, an image loading request is sent to the image reading module.
6. Upon receiving the image loading request from the image logic processing module, the image reading module sends an image searching request to the storage module.
7. The storage module returns a designated image according to the image searching request.
8. The image reading module parses the returned image, and converts the image into an image in a uniform format in the memory and returns the converted image to the image logic processing module.
9. The image logic processing module sends an image processing request to the image process scheduling and controlling submodule.
10. The image process scheduling and controlling submodule sends, in a polling manner, a request for querying resource usage details of a machine to each registered image process scheduling feedback submodule.
11. Each requested image process scheduling feedback submodule acquires the resource usage details of the machine where it runs, and feeds back the acquired resource usage details to the image process scheduling and controlling submodule.
12. The image process scheduling and controlling submodule sends, in a polling manner, a request for querying resource usage details of a machine to each registered image process scheduling feedback submodule.
13. Each requested image process scheduling feedback submodule acquires the resource usage details of the machine where it is registered, and feeds back the acquired resource usage details to the image process scheduling and controlling submodule.
14. The image process scheduling and controlling submodule selects a machine with a lowest load according to the resource usage details of all the machines that are fed back, and sends a request for processing the image to the selected machine.
15. The image processing module processes the image according to the request, and returns the processed image to the image process scheduling and controlling submodule.
16. The image process scheduling and controlling submodule receives the returned image, and sends it to the image logic processing module.
17. The image logic processing module sends an image caching request to the image caching module.
18. The image caching module searches for the corresponding image. If the image has been cached previously, the image in the cache is updated; if the image has not been cached previously, the image is directly stored. After the image is updated, the image caching module notifies the image logic processing module that the image has been updated.
19. The image logic processing module sends an image converting request to the image converting module.
20. The image converting module converts the image upon receiving the image converting request, and returns the converted image to the image logic processing module.

21. The image logic processing module returns the image converted by the image converting module to the Web server.

22. The Web server returns the final image (the image converted by the image converting module) to the client terminal, and the final image is directly parsed and presented through a client terminal browser.

Figure 4:
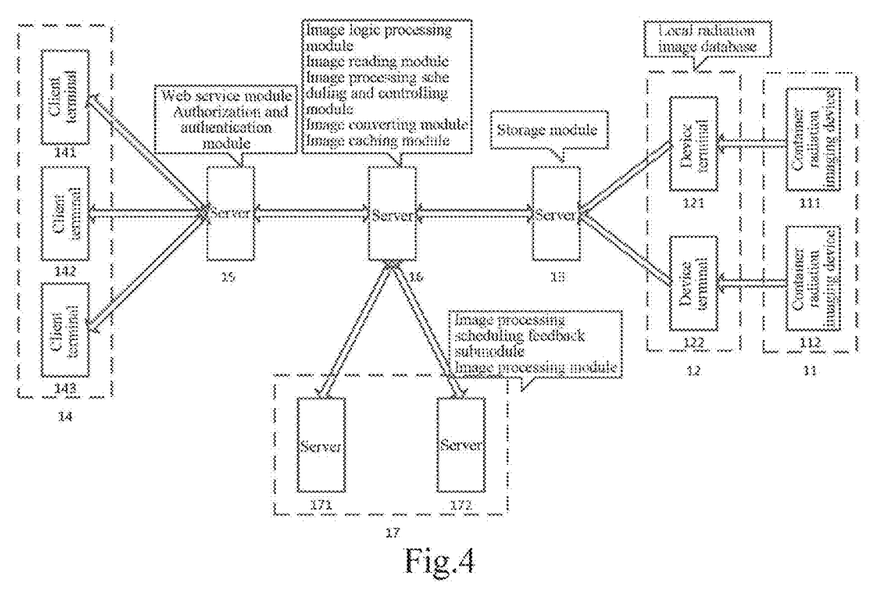
FIG. 4 is a block diagram of an example of the radiation image inspection system according to the present disclosure.

FIG. 4 is a block diagram of an example of the radiation image inspection system according to the present disclosure. As illustrated in FIG. 4, for example, a schematic diagram showing configuration of the system according to the present disclosure used by the Customs is given. In the system, at least one radiation imaging device terminal 11 is composed of container radiation imaging devices 111 and 112. A local radiation image database 12 is composed of local devices 121 and 122. The local device 121 stores radiation images acquired by the container imaging device 111. The local device 122 stores radiation images acquired by the container imaging device 112. A centralized image storage machine 13 is provided with a storage module of the inspection system and a client terminal 14 used by an inspection terminal, wherein the client terminal 14 is composed of a client terminal 141, a client terminal 142, and a client terminal 143. A Web server 15 is provided with a Web service module, and an authorization and authentication module. An application server 16 is provided with an image logic processing module, an image reading module, an image process scheduling and controlling module, an image converting module, and an image caching module. At least one image processing server 17 is composed of a server 171 and a server 172, wherein each server may be provided with an image process scheduling feedback module and an image processing module.

Figure 5:
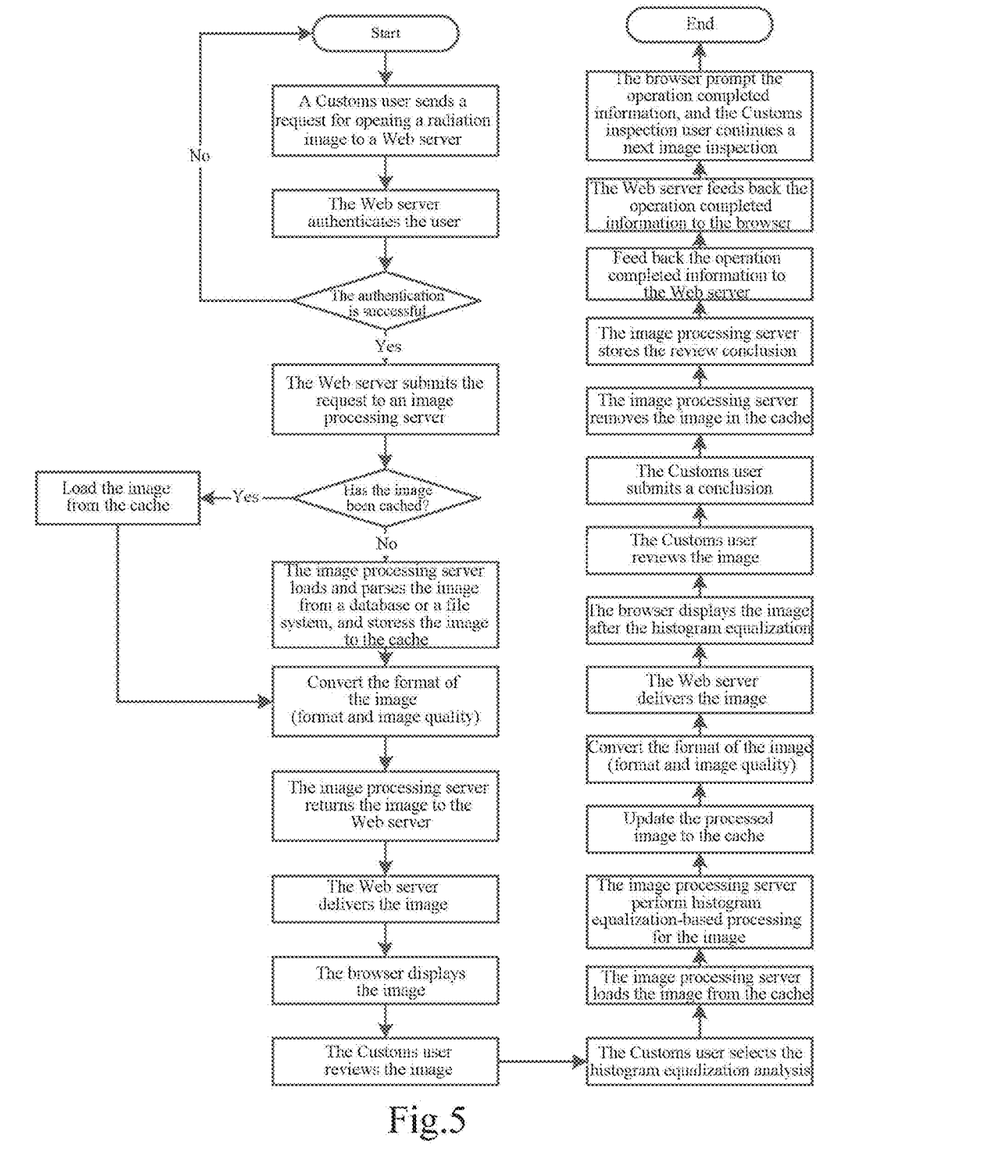
FIG. 5 is a flowchart of an example of a process of image processing performed by the radiation image inspection system according to the present disclosure.

As illustrated in FIG. 5, the steps involved in the entire image inspection are specifically described by using the process that a Customs inspection user performs a histogram equalization inspection on the radiation image as an example. In an image inspection performed by the Customs, a typical process includes: designating an image by the user, loading the image by the system, selecting an image processing operation by the user, performing the corresponding image processing operation by the system, returning the processed image by the system, checking the resulted image by the user, submitting a conclusion by the user, and storing the conclusion by the system. The specific steps are as follows:

Step 1: The Customs inspection user selects a radiation image, and sends a request for opening the radiation image to a Web server.

Step 2: Upon receiving the request for opening the radiation image, the Web server authenticates the user. If the user is an unauthorized user, the Web server returns information indicative of failure of the user authentication, and requests the user to re-input personal authorization information. If the user is an authorized user, the Web server submits a request to an image processing application server.

Step 3: The image processing application server firstly checks whether the image caching module stores the requested image. If the requested image is stored in the image caching module, the image is directly loaded from the image caching module and step 5 is performed. If the requested image is not stored in the image caching module, step 4 is performed.

Step 4: The image processing application sever reads the designated image into a memory, converts the image into a uniform format, and stores the image into the image caching module.

Step 5: The image processing application server invokes the image converting module to convert the image into a JPEG format and into a medium image quality, and feeds back the converted image to the Web server.

Step 6: The Web server delivers the image to a browser of the Customs inspection user.

Step 7: The browser of the Customs inspection user displays the image, and the Customs inspection user reviews the image.

Step 8: The Customs inspection user selects a histogram equalization operation for the image, and sends a histogram equalization operation request to the Web server.

Step 9: Upon receiving the histogram equalization operation request, the Web server authenticates the user. If the user is an unauthorized user, the Web server returns information indicative of failure of the user authentication, and requests the user to re-input personal authorization information. If the user is an authorized user, the Web server submits a request to the image processing application server.

Step 10: The image processing application server directly loads the image from the image caching module.

Step 11: The image processing application server invokes the image processing module to perform histogram equalization processing for the image, and update the processed image to the image caching module.

Step 12: The image converting module is invoked to perform a format conversion and an image quality conversion for the image obtained upon the histogram equalization processing by invoking the image converting module, to convert the image into a JPEG format and into a medium image quality, and the converted image is fed back to the Web server.

Step 13: The Web server delivers the image to the browser of the Customs inspection user.

Step 14: The browser of the Customs inspection user displays the image, and the Customs inspection user reviews the image obtained upon the histogram equalization.

Step 15: The Customs inspection user submit the conclusion, and sends a conclusion submission request to the Web server.

Step 16: Upon receiving the request for opening the radiation image, the Web server authenticates the user. If the user is an unauthorized user, the Web server returns information indicative of failure of the user authentication, and requests the user to re-input personal authorization information. If the user is an authorized user, the Web server submits a request to the image processing application server.

Step 17: The image processing application server removes the corresponding image from the image caching module.

Step 18: The image processing application server invokes the storage module to store the inspection conclusion of the image.

Step 19: Information indicative of successful storage of the inspection conclusion is fed back to the Web server.

Step 20: The Web server delivers the prompt information to the browser of the Customs inspection user.

Step 21: The browser gives a success prompt, and the Customs inspection user continues a next image inspection.

Figure 6:
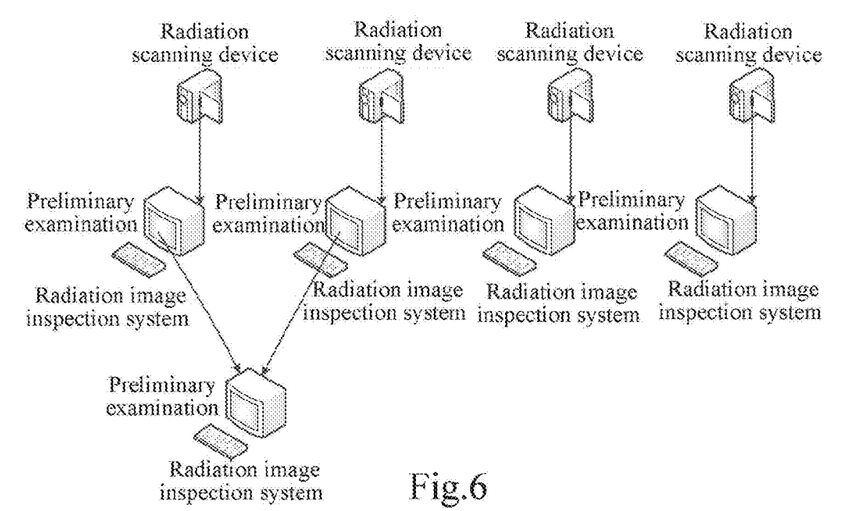
FIG. 6 is a schematic diagram showing configuration of the radiation image inspection system according to the related art.
Figure 7:
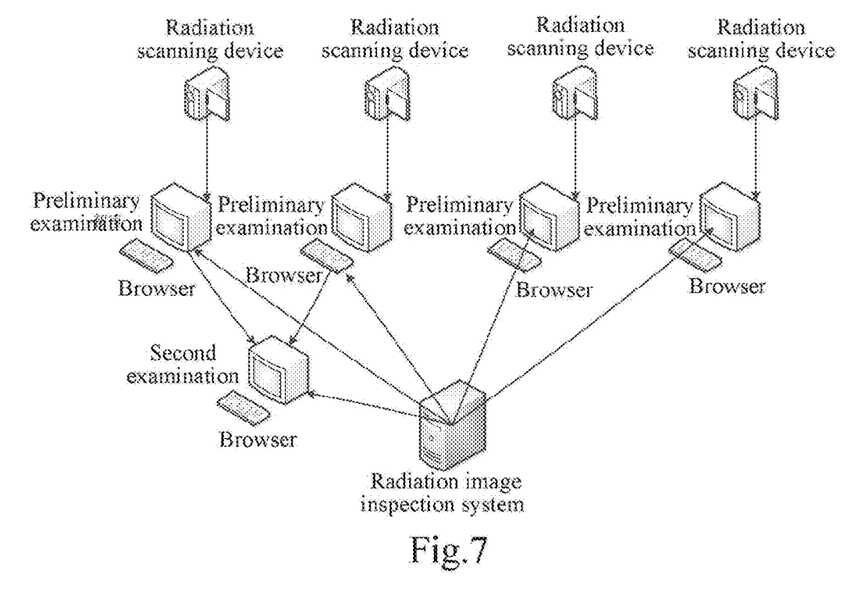
FIG. 7 is a schematic diagram showing configuration of the radiation image inspection system according to the present disclosure.

In addition, FIG. 6 is a schematic usage diagram showing configuration of the radiation image inspection system according to the related art; and FIG. 7 is a schematic diagram showing configuration of the radiation image inspection system according to the present disclosure. Such radiation image inspection system based on the B/S mode has a significant application value and achieves great economic benefits. Using the China Customs inspection system as an example, before the present application, the large-size container inspection systems used by China Customs all use independently running programs in the form of software development package. Installation and maintenance of hundreds of workstations for the radiation image inspection are labor-consuming, resource-consuming, and time-consuming. In addition, the software runs in an independent manner, such that it is impossible that the radiation image inspection system be integrated with another system such as a Customs clearance system. Implementation of the system may thoroughly change such situation of the radiation image inspection system in China Customs. A browser is only needed on the client terminal, all the radiation images are centrally processed on the server, and the client terminal only displays the results. Further, the system is based on the B/S architecture, such that the system may be simply integrated with other systems of the Customs. In this way, the system has better maintainability and extensibility. Moreover, in the system according to the present disclosure, image caching, image, distributed image manufacturing and process, and image conversion are employed such that the processing performance of original independent software is reached in case of good network conditions. As for the performance of the machine where the original software is installed, herein the term "reach" refers to that the processing performance of the original machine is close to the performance of the image processing machine in the system, but practically the performance of the machine where the original independent software is installed is lower than that of the centralized processing machine in the system.

What is claimed is:

1. A radiation image inspection system, comprising:
   at least one client terminal, configured to initiate an image operation request to a Web server, and display an image operation result on a browser of the client terminal upon receiving a response from the Web server;
   an image processor, configured to query, based on the image operation request from the client terminal and forwarded by the Web server, an image which the client terminal desires to process, perform an operation on the image as requested by the client terminal, convert the resulted image into an image in a designated format and quality, return a converted image to the browser of the client terminal via the Web server for displaying, receive a suspected remark and conclusion of the converted image from the at least one client terminal, and store, in connection with the converted image, the suspected remark and conclusion together with said converted image in a storage; and
   the Web server, configured to receive the image operation request from the client terminal, forward the image operation request to the image processor, return the image operation result from the image processor to the client terminal, and forward the suspected remark and conclusion in connection with the converted image from the at least one client terminal to the image processor,
   wherein the image processor is further configured to:
   receive the image operation request from the at least one client terminal via the Web server;
   store cached images;
   in response to the image operation request, search the cached images to determine a match between a cached image and the image which the client terminal desires to process; and
   when it is determined that there is no match between the cached image and the image which the client terminal desires to process, load an image which the client terminal desires to process from the storage for storing an original format and a converted format of the image, together with a suspected remark and conclusion sent from the at least one client terminal to the image processor.

2. The radiation image inspection system according to claim 1, wherein the image processor is further configured to schedule and control image processing.

3. The radiation image inspection system according to claim 1, wherein,
   the Web server performs an authentication to the image operation request which the Web server received, denies the image operation request which does not pass the authentication, and forwards the image operation request which passes the authentication to the image processor.

4. A radiation image inspection system, comprising:
   at least one radiation imaging device terminal;
   a radiation image database, configured to store radiation images obtained by the at least one radiation imaging device terminal;
   a centralized image storage machine, configured to store images and data from the radiation image database, store an original format and a converted format of the image, together with a suspected remark and conclusion sent from at least one inspection terminal to the application server;
   at least one inspection terminal;
   a Web server;
   an application server; and
   at least one image processing server;
   wherein the application server is configured to:
   receive an image operation request from each image inspection terminal via the Web server, and schedule and control image processing;
   load and parse an image; and
   send a request for querying, in a polling manner, resource usage details to each image processing server;
   wherein each image processing server is configured to acquire resource usage details of a corresponding current image processing server, and feed back the resource usage details to the application server; and
   wherein the application server is further configured to select an image processing server with a lowest resource usage rate according to the resource usage details of the image processing servers and send the image processing request to the selected image processing server,
   wherein the selected image processing server is configured to:
   receive the image operation request from the application server;
   store cached images;
   in response to the image operation request, search the cached images to determine a match between a cached image and the image loaded and parsed by the application server; and
   when it is determined that there is no match between the cached image and the image loaded and parsed by the application server, load an image which the image inspection terminal desires to process from the centralized image storage machine.

5. The radiation image inspection system according to claim 4, wherein,
   the application server is further configured to;
   convert the image; and in response to the image operation request, search for a cached image which the client terminal desires to process in the application server; and load and parse the image when the image which the client terminal desires to process is not cached in the application server.

6. The radiation image inspection system according to claim 5, wherein,
the Web server is further configured to perform an authentication to the image operation request which the Web server received, deny the image operation request which does not pass the authentication, and forward the image operation request which passes the authentication to the application server.

7. A radiation image inspection method, comprising the following steps:
step 1, after a client terminal sends a request for processing an image to a Web server via a Web browser, an application server receives the request for processing the image forwarded by the Web server;
step 2, the application server judges situations according to the request for processing the image, in a situation where the image has been cached in the application server, reads the image directly from the application server; and in a situation where the image has not been cached in the application server, load and parse the image from a storage for storing an original format and a converted format of the image, together with a suspected remark and conclusion sent from the at least one client terminal to the image processor; and
step 3, the application server caches the processed image and returns the resulted image to the Web server, and the resulted image is returned to the client terminal via the Web server, for displaying on the Web browser,
step 4, the application server receives a suspected remark and conclusion of the converted image from the client terminal, and store, in connection with the converted image, the suspected remark and conclusion together with said converted image in the storage,
further comprising an image processing server:
receiving the image operation request from the application server;
storing cached images;
in response to the image operation request, searching the cached images to determine a match between a cached image and the image; and
when it is determined that there is no match between the cached image and the image, load an image which the client terminal desires to process from the storage.

8. The radiation image inspection method according to claim 7, wherein,
in the step 1, after the Web server receives the request for processing the image, the Web server perform an authentication to the client terminal which sends the request, and only when the client terminal is authenticated as a legal client terminal and having permission to processing the image, forwards the request for processing the image to the application server.

9. The radiation image inspection method according to claim 7, wherein,
in the step 3, after the application server processes the corresponding image, the application server converts the resulted image into an image in a designated format and precision, and returns the converted image to the Web server.

10. A non-transitory computer-readable storage medium storing instructions that, when executed by a processor of a server, cause the server to perform:
step 1, after a client terminal sends a request for processing an image to a Web server via a Web browser, an application server receives the request for processing the image forwarded by the Web server;
step 2, the application server, judges situations according to the request for processing the image, in a situation where the image has been cached in the application server, reads the image directly from the application server; and in a situation where the image has not been cached in the application server, load and parse the image from a storage for storing an original format and a converted format of the image, together with a suspected remark and conclusion sent from the at least one client terminal to the image processor;
step 3, the application server caches the processed image and returns the resulted image to the Web server, and the resulted image is returned to the client terminal via the Web server, for displaying on the Web browser; and
step 4, the application server receives a suspected remark and conclusion of the converted image from the client terminal, and store in connection with the converted imam the suspected remark and conclusion together with said converted image in the storage,
an image processing server:
receiving the image operation request from the application server;
storing cached images;
in response to the image operation request, searching the cached images to determine a match between a cached image and the image; and
when it is determined that there is no match between the cached image and the image, load an image which the client terminal desires to process from the storage.

11. The non-transitory computer-readable storage medium according to claim 10, wherein,
in the step 1, after the Web server receives the request for processing the image, the Web server perform an authentication to the client terminal which sends the request, and only when the client terminal is authenticated as a legal client terminal and having permission to processing the image, forwards the request for processing the image to the application server.

12. The non-transitory computer-readable storage medium according to claim 10, wherein,
in the step 3, after the application server processes the corresponding image, the application server converts the resulted image into an image in a designated format and precision, and returns the converted image to the Web server.

* * * * *